United States Patent
Currivan et al.

(10) Patent No.: US 8,897,147 B2
(45) Date of Patent: Nov. 25, 2014

(54) SPECTRUM ANALYSIS CAPABILITY IN NETWORK AND/OR SYSTEM COMMUNICATION DEVICES

(71) Applicant: Broadcom Corporation, Irvine, CA (US)

(72) Inventors: Bruce J. Currivan, Los Altos, CA (US); Roger Fish, Superior, CO (US); Harold Raymond Whitehead, Suwanee, GA (US); Thomas J. Kolze, Phoenix, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/931,626

(22) Filed: Jun. 28, 2013

(65) Prior Publication Data

US 2013/0286855 A1    Oct. 31, 2013

Related U.S. Application Data

(63) Continuation-in-part of application No. 13/428,309, filed on Mar. 23, 2012, and a continuation-in-part of application No. 13/428,698, filed on Mar. 23, 2012.

(60) Provisional application No. 61/666,750, filed on Jun. 29, 2012, provisional application No. 61/819,279, filed on May 3, 2013, provisional application No. 61/467,659, filed on Mar. 25, 2011, provisional application No. 61/467,638, filed on Mar. 25, 2011, provisional application No. 61/467,659, filed on Mar. 25, 2011, provisional application No. 61/467,673, filed on Mar. 25, 2011, provisional application No. 61/474,186, filed on Apr. 11, 2011.

(51) Int. Cl.
*H04L 1/00* (2006.01)
*H04L 12/26* (2006.01)
*H04L 12/28* (2006.01)
*H04L 25/02* (2006.01)
*H04L 1/20* (2006.01)
*H04L 25/03* (2006.01)

(52) U.S. Cl.
CPC ....... *H04L 43/50* (2013.01); *H04L 2025/03414* (2013.01); *H04L 25/022* (2013.01); *H04L 1/20* (2013.01); *H04L 25/03006* (2013.01)
USPC .................................................... 370/242

(58) Field of Classification Search
None
See application file for complete search history.

(56) References Cited

U.S. PATENT DOCUMENTS

6,385,773 B1 * 5/2002 Schwartzman et al. ....... 725/124
6,570,913 B1 * 5/2003 Chen ............................. 375/223

(Continued)

*Primary Examiner* — Suk Jin Kang
(74) *Attorney, Agent, or Firm* — Garlick & Markison; Shayne X. Short

(57) ABSTRACT

Spectrum analysis (SA) capability is included in various communication devices within a communication network. One or more of the devices use the SA information from other devices in the system to determine status of various communication links were devices in the system. One or more processors within one or more devices can identify any actual/existing or expected failure or degradation of the various components within the system. Such components may include communication devices, communication channels or links, interfaces, interconnections, etc. When an actual/existing or expected failure or degradation is identified, the affected components may be serviced or devices within the system may operate to mitigate any reduction in performance caused by such problems. Such SA functionality/capability may be implemented in one communication device or in a distributed manner across a number of devices in a communication system.

20 Claims, 10 Drawing Sheets

(56) References Cited

U.S. PATENT DOCUMENTS

| | | | |
|---|---|---|---|
| 6,711,135 B1* | 3/2004 | Dziekan et al. | 370/242 |
| 6,728,887 B1* | 4/2004 | Dziekan et al. | 726/3 |
| 6,757,253 B1* | 6/2004 | Cooper et al. | 370/241 |
| 6,775,840 B1* | 8/2004 | Naegel et al. | 725/111 |
| 7,796,526 B2* | 9/2010 | Miller | 370/241 |
| 8,146,125 B2* | 3/2012 | Grinkemeyer et al. | 725/107 |
| 2003/0039319 A1* | 2/2003 | Engelse et al. | 375/316 |
| 2003/0149991 A1* | 8/2003 | Reidhead et al. | 725/119 |
| 2003/0179821 A1* | 9/2003 | Lusky et al. | 375/224 |
| 2003/0181185 A1* | 9/2003 | Lusky et al. | 455/295 |
| 2003/0182664 A1* | 9/2003 | Lusky et al. | 725/111 |
| 2003/0185176 A1* | 10/2003 | Lusky et al. | 370/335 |
| 2003/0185228 A1* | 10/2003 | Buda et al. | 370/442 |
| 2003/0188254 A1* | 10/2003 | Lusky et al. | 714/784 |
| 2004/0146038 A1* | 7/2004 | Dale et al. | 370/348 |
| 2004/0203392 A1* | 10/2004 | Hsu et al. | 455/62 |
| 2005/0140354 A1* | 6/2005 | Meir | 324/76.22 |
| 2005/0226164 A1* | 10/2005 | Williams | 370/242 |
| 2005/0281200 A1* | 12/2005 | Terreault | 370/241 |
| 2005/0281344 A1* | 12/2005 | Wall | 375/259 |
| 2008/0062888 A1* | 3/2008 | Lusky et al. | 370/252 |
| 2009/0007210 A1* | 1/2009 | Nishide et al. | 725/125 |
| 2010/0158093 A1* | 6/2010 | Thompson et al. | 375/227 |
| 2010/0223650 A1* | 9/2010 | Millet et al. | 725/111 |
| 2013/0030765 A1* | 1/2013 | David | 702/183 |
| 2013/0070826 A1* | 3/2013 | Nielsen et al. | 375/222 |
| 2013/0088993 A1* | 4/2013 | Nielsen et al. | 370/252 |
| 2014/0010269 A1* | 1/2014 | Ling et al. | 375/222 |
| 2014/0082686 A1* | 3/2014 | Maxson et al. | 725/125 |

* cited by examiner

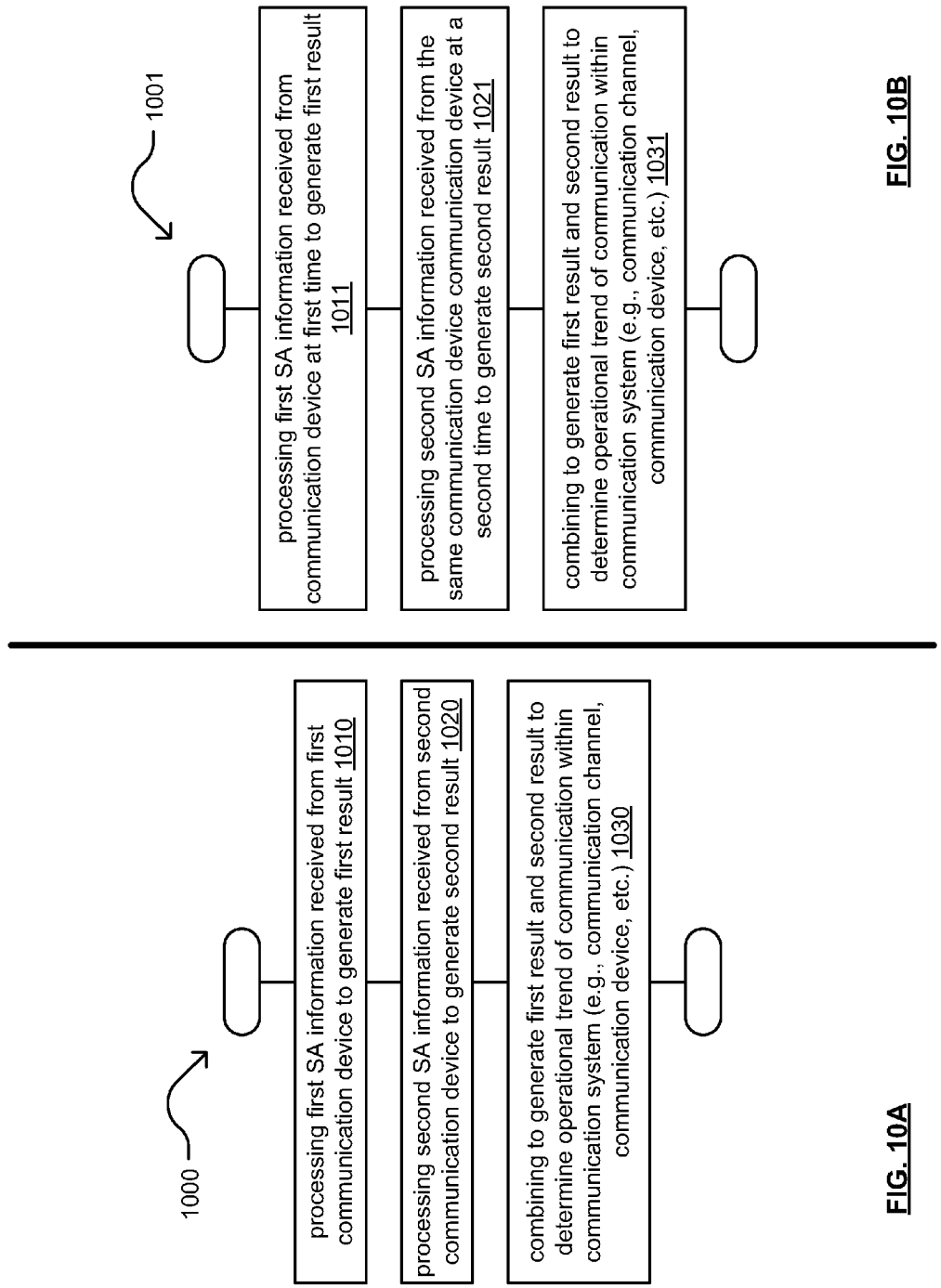

SPECTRUM ANALYSIS CAPABILITY IN NETWORK AND/OR SYSTEM COMMUNICATION DEVICES

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:
1. U.S. Provisional Pat. App. Ser. No. 61/666,750, entitled "Spectrum analysis capability in network and/or system communication devices," filed Jun. 29, 2012.
2. U.S. Provisional Pat. App. Ser. No. 61/819,279, entitled "Spectrum analysis capability in network and/or system communication devices," filed May 3, 2013.

Continuation-In-Part (CIP) Priority Claims, 35 U.S.C. §120

The present U.S. Utility Patent Application claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:
1. U.S. Utility patent application Ser. No. 13/428,309, entitled "Upstream frequency response measurement and characterization," filed Mar. 23, 2012, pending, which claims priority pursuant to 35 U.S.C. §119(e) to the following U.S. Provisional Patent Application which is hereby incorporated herein by reference in its entirety and made part of the present U.S. Utility Patent Application for all purposes:
  1.1. U.S. Provisional Pat. App. Ser. No. 61/467,659, entitled "Upstream frequency response measurement and characterization," filed Mar. 25, 2011.

The present U.S. Utility Patent Application also claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:
2. U.S. Utility patent application Ser. No. 13/428,698, entitled "Characterization and assessment of communication channel average group delay variation," filed Mar. 23, 2012, pending, which claims priority pursuant to 35 U.S.C. §119 (e) to the following U.S. Provisional Patent Applications which are hereby incorporated herein by reference in their entirety and made part of the present U.S. Utility Patent Application for all purposes:
  2.1. U.S. Provisional Pat. App. Ser. No. 61/467,638, entitled "Detection and characterization of laser clipping within communication devices," filed Mar. 25, 2011.
  2.2. U.S. Provisional Pat. App. Ser. No. 61/467,659, entitled "Upstream frequency response measurement and characterization," filed Mar. 25, 2011.
  2.3. U.S. Provisional Pat. App. Ser. No. 61/467,673, entitled "Upstream burst noise measurement and characterization during data transmission," filed Mar. 25, 2011.
  2.4. U.S. Provisional Pat. App. Ser. No. 61/474,186, entitled "Characterization and assessment of communication channel average group delay variation," filed Apr. 11, 2011.

BACKGROUND

1. Technical Field

The present disclosure relates generally to communication systems; and, more particularly, to characterizing, tracking, and/or monitoring operation of various components and/or elements within such communication systems 2. Description of Related Art Data communication systems have been under continual development for many years. Sometimes, problems may occur that affect one or more of the various components within such communication systems so that the overall performance is less than optimal. Various problems such as equipment failure, degrading interfaces or connectors, etc. reduce the overall effectiveness of communications within such communication systems.

Diagnosis of such problems is typically performed by service personnel who conduct a service call to one or more locations where customers complain of poor service. Also, such service personnel can only analyze one given location at a time. A great deal of time is required to perform analysis of multiple locations within a communication system, and this procedure may be very labor and cost intensive.

Even after existing problems are identified and repaired, other problems may subsequently arise and cause other problems which also lead to degradation of the communication system's performance. Generally, a communication system's overall performance and fitness is dynamic and changing over time.

BRIEF DESCRIPTION OF THE SEVERAL VIEWS OF THE DRAWINGS

FIG. 10A is a diagram illustrating another embodiment of a method for execution by one or more communication devices.

FIG. 10B is a diagram illustrating another embodiment of a method for execution by one or more communication devices.

DETAILED DESCRIPTION

Figure 1:
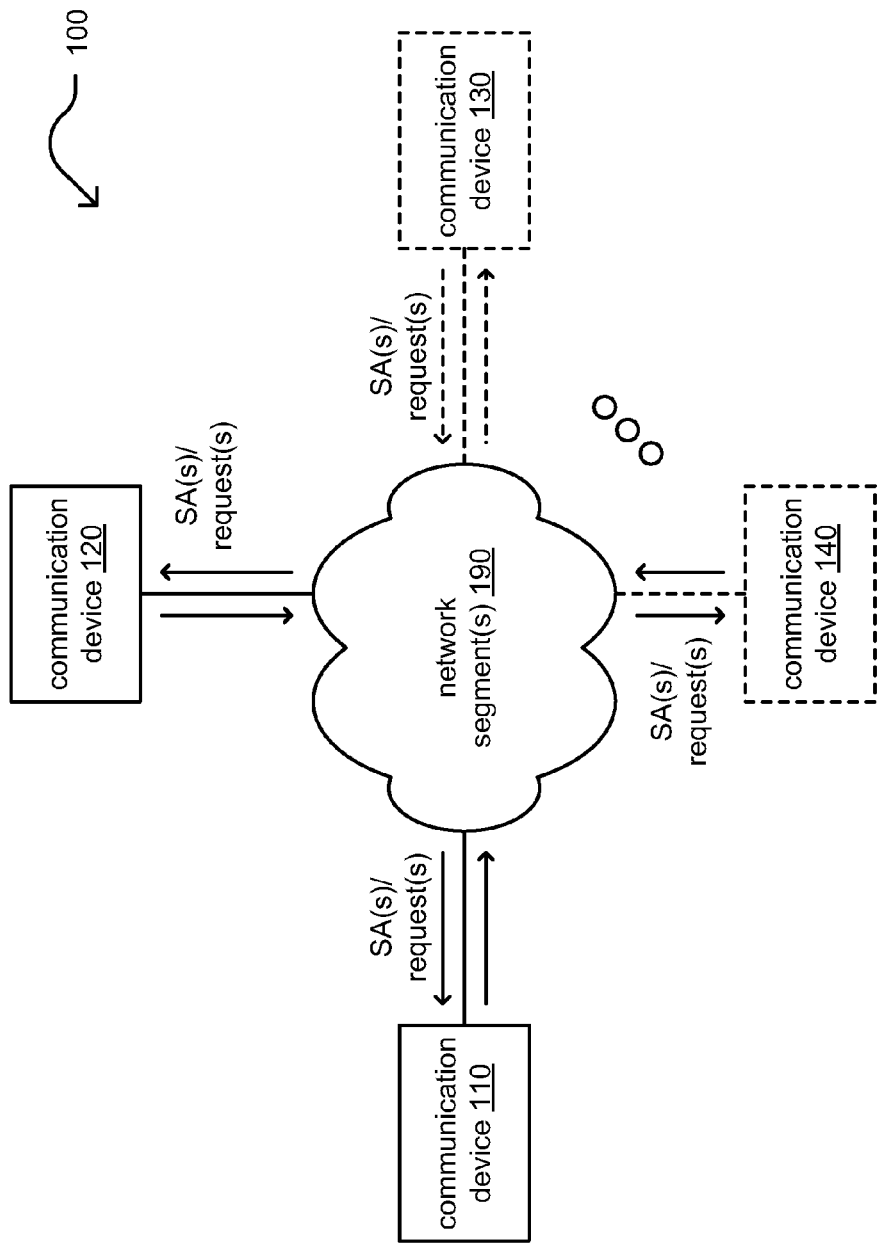
FIG. 1 is a diagram illustrating an embodiment of one or more communication systems.

FIG. 1 is a diagram illustrating an embodiment 100 of one or more communication systems. One or more network segments 190 provide communication inter-connectivity for at least two communication devices 110 and 120. Generally speaking, any desired number of communication devices are included within one or more communication systems (e.g., as shown by communication devices one 130 and 140). Some or all the various communication devices 110-140 include capability to generate spectrum analysis (SA) information based on the one or more communication channels via which they communicate to other devices. For example, SA information may include various characteristics such as a communication channels frequency response, a device's internal frequency response (e.g., how that devices operation may affect the various communication channels via which it communicates), interference or noise detected on communication channel, reflections, frequency nulls on a communication channel, etc. Also, such SA information may correspond to changes or trends associated with any such characteristics. The various devices 110-140 provide SA information to other of the devices 110-140 for use in determining the operation of the one or more communication systems. SA information may be provided automatically between various devices 110-140, such as at particular times (e.g., periodically, or aperiodically such as when a device is idle or has processing capability to generate such SA information, such as when not using all of the device's processing resources or capabilities). Alternatively, such SA information may be provided upon one device requesting it from another. Generally, a device (e.g., cable modem termination system (CMTS)) can receive various SA information from different devices in the one or more communication systems. At least some of this SA information is based on full bandwidth of a usable frequency spectrum in the one or more communication systems. For example, in the context of a cable based system, at least some SA information is wideband to allow observation of the whole cable plant signal from 54 MHz to 1008 MHz and beyond these limits. Based on the received SA information, this device then has a great deal of visibility into the one or more communication systems. From the perspective of a device such as a CMTS in a cable based system, the CMTS has a broad range of visibility into the entirety of the downstream radio frequency (RF) including any or all of the various service flows included in such a cable plant system such as those described with reference to FIG. 2.

For an example of operation, device 110 includes a communication interface to transmit a signal to device 122 request SA information there from. The device 110 includes a processor to process the received SA information and to determine one or more other characteristics (e.g., which can be used to identify an operational error, failure, or degradation, an operational trend, a future or expected operational error, failure, or degradation, etc.) associated with performance of one or more communication channels in the system. Based on the one or more other characteristics, the device 110 may then identify an actual/existing and/or expected failure or degradation of communication associated with those one or more communication channels.

In another example of operation, device 110 may receive first SA information from device 120 and second SA information from device 130. Device 110 can then employ both the first SA information and the second SA information to determine an operational trend of one or more communication channels in the system. This first SA information and second SA information may correspond to two entirely different components within the system, or it may correspond to a common components (e.g., such that the first and second SA information corresponds to two different times).

In an example of SA information generation, device 120 may receive a signal that includes pilot tones from device 110. Device 120 can then process the received pilot tones, and compared to their expected values, can determine the effect of the communication link between devices 110 and 120. That is to say, device 120 generates SA information based on characterization of the pilot tones received from device 110. Device 120 can then provide this SA information may then be provided to device 110 automatically or upon request. In addition, device 120 may use this recently generated SA information to characterize operation of the communication link between devices 110 and 120 including identifying an actual/existing or expected failure or degradation of communication via that communication link.

In another example of SA information generation, device 120 may include an equalizer that employs equalizer coefficients to perform equalization of signals that it receives. Device 120 may provide SA information to device 110 that is based on the values of those equalizer coefficients or changes in those equalizer coefficients relative to prior values.

Also, any of the various devices 110-140 may have an internal frequency response that affects operation of the system, and SA information may be based on a given device's internal frequency response. For example, device 120 may provide essay information to device 110 that is based on the frequency response of the device 120 in terms of its effect on the system.

Various examples have been described in which a given device, such as device 110, performs the appropriate processing to determine an operational trend of one or more components in the system and also to identify an actual/existing or expected failure or degradation of communication associated with those one or more components. Note also that such processing may be implemented in a distributed manner among two or more of the devices 110-140. That is to say, two or more of the devices 110-140 may operate cooperatively to process SA information and to determine any such actual/existing or expected failure or degradation of communication associated with those one or more components. The various devices 110-140 may communicate signals amongst one another related to such actual/existing or expected failure or degradation of communication associated with those one or more components. Generally speaking, such SA functionality/capability may be implemented in a distributed manner across a number of devices within one or more communication systems. Also, when an actual/existing or expected failure or degradation is identified, the affected components may be serviced (e.g., by service personnel) or devices within the system may operate adaptively to mitigate any reduction in performance caused by such problems.

With respect to a particular type of SA functionality included within a remote device (e.g., within any of the various devices 110-140), the remote SA functionality may be wideband (e.g., observing the entire usable frequency spectrum associated with the communication system). For example, considering a cable plant type implementation, remotely implemented SA functionality may be wideband to allow observation of the whole cable plant signal from 54 MHz to 1008 MHz and beyond these limits. This permits the headend (or CMTS) to view problems that are affecting channels other than the ones currently in use by a given home/premises. For example, a micro-reflection in the cable may produce a ripple in the frequency response with a relative null on a given frequency channel "A". The user may at the current time be using channel "B" which is not affected by the null, so his service has not yet been compromised by the presence of this reflection. However, in the future the null could move in frequency close to channel A (due to phase changes in the physical process producing the reflection/null), or the service currently on channel B could be moved to channel A, either of which would cause the null to begin to affect the service at this customer. With the wideband SA the headend (or CMTS) will observe the null on channel A, and will be able to perform preventive maintenance to fix the reflection/null before the problem occurs.

Figure 2:
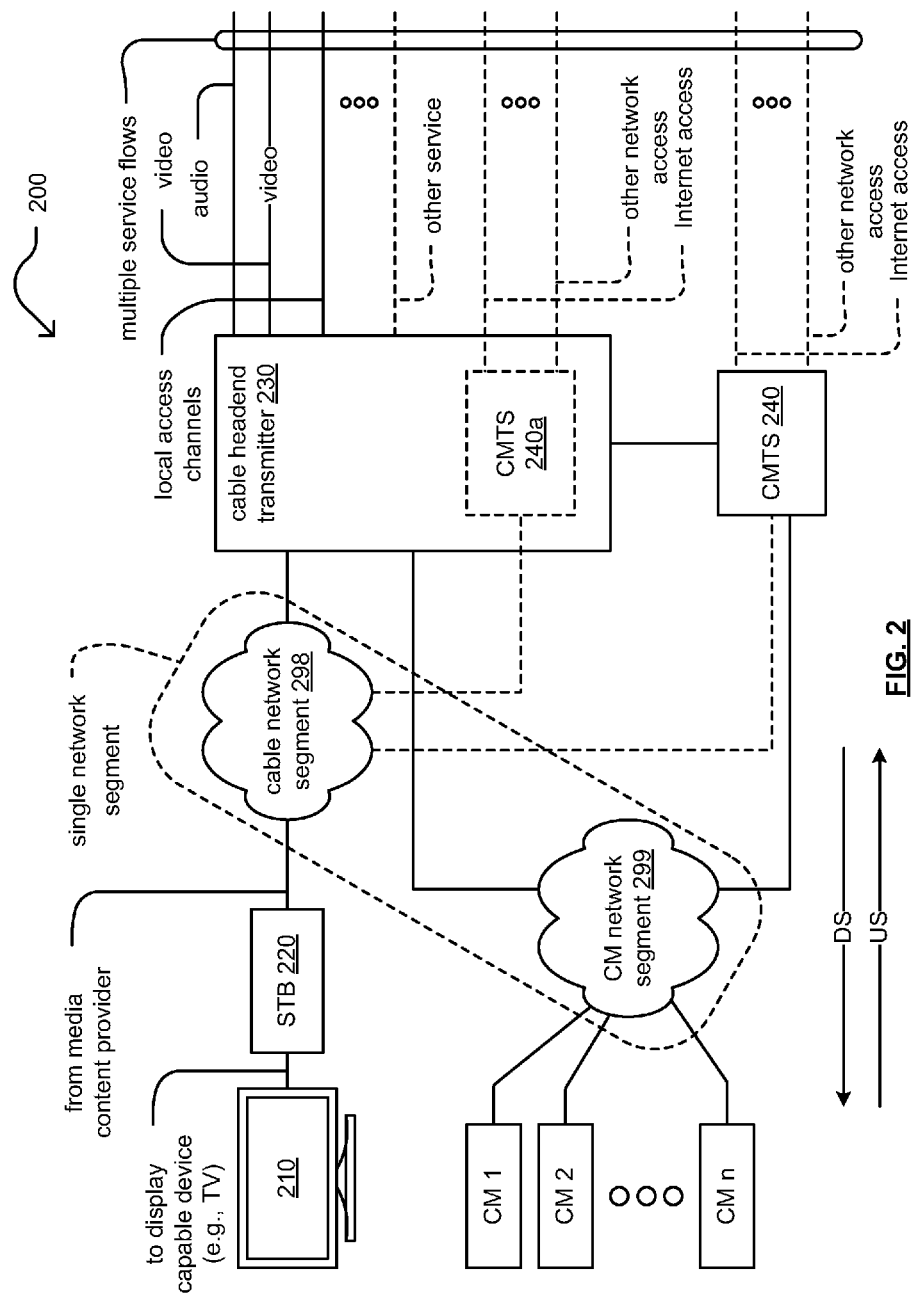
FIG. 2 is a diagram illustrating another embodiment of one or more communication systems.

FIG. 2 is a diagram illustrating another embodiment 200 of one or more communication systems. A cable headend transmitter 230 provides service to a set-top box (STB) 220 via cable network segment 298. The STB 220 provides output to a display capable device 210. The cable headend transmitter 230 can support any of a number of service flows such as audio, video, local access channels, as well as any other service of cable systems. For example, the cable headend transmitter 230 can provide media (e.g., video and/or audio) to the display capable device.

The cable headend transmitter 230 may provide operation of a cable modem termination system (CMTS) 240a. That is to say, the cable headend transmitter 230 may perform such CMTS functionality, or a CMTS may be implemented separately from the cable headend transmitter 230 (e.g., as shown by reference numeral 240). The CMTS 240 can provide network service (e.g., Internet, other network access, etc.) to any number of cable modems (shown as CM 1, CM 2, and up to CM n) via a cable modem (CM) network segment 299. The cable network segment 298 and the CM network segment 299 may be part of a common network or common networks. The cable modem network segment 299 couples the cable modems 1-n to the CMTS (shown as 240 or 240a). Such a cable system (e.g., cable network segment 298 and/or CM network segment 299) may generally be referred to as a cable plant and may be implemented, at least in part, as a hybrid fiber-coaxial (HFC) network (e.g., including various wired and/or optical fiber communication segments, light sources, light or photo detection complements, etc.).

A CMTS 240 or 240a is a component that exchanges digital signals with cable modems 1-n on the cable modem network segment 299. Each of the cable modems coupled to the cable modem network segment 299, and a number of elements may be included within the cable modem network segment 299. For example, routers, splitters, couplers, relays, and amplifiers may be contained within the cable modem network segment 299. Generally speaking, downstream information may be viewed is that which flows from the CMTS 240 to the connected cable modems (e.g., CM 1, CM 2, etc.), and upstream information is that which flows from the cable modems to the CMTS 240.

At least some of the devices within this diagram support the SA information functionality described herein. For one example of operation, the CMTS 240 may be implemented to include a communication interface to transmit a signal to CM 1 to request SA information there from. The CMTS 240 includes a processor to process the received SA information and to determine an operational trend of one or more communication channels in the system (e.g., between the CMTS 240 in the CM 1). Based on the operational trend, the CMTS 240 may then identify an actual/existing or expected failure or degradation of communication associated with those one or more communication channels. Analogously, any of the other devices within the diagram may also include such SA capability as described herein. The various devices within the diagram may communicate SA information to each other and also provide information based on operational trends and actual/existing or expected failures or degradations of communications made along the various communication paths between the various devices in the diagram. In one example of operation, any one or more of the cable modems or and/or the STB 220 can include capability to generate SA information based on one or more communication channels within the communication system. Some or all of the SA information can be based on full bandwidth of a usable frequency spectrum in the communication system. This SA information can be provided to another device (e.g., the CMTS 240) for use in determining one or more characteristics associated with performance of the one or more communication channels in the communication system and for identifying, based on the one or more characteristics, a degradation of communication associated with the one or more communication channels.

Figure 3:
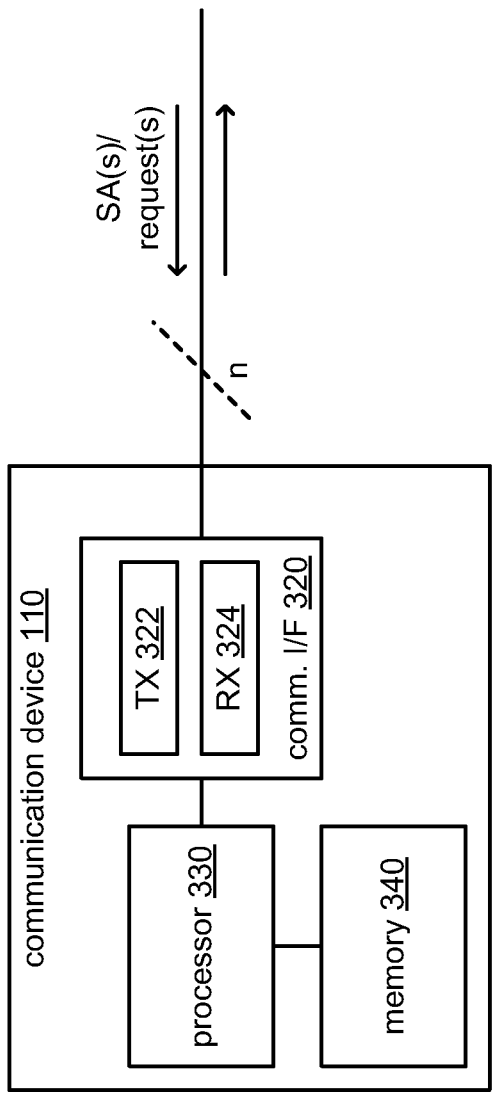
FIG. 3 is a diagram illustrating a communication device operative within one or more communication systems.

FIG. 3 is a diagram illustrating a communication device 110 operative within one or more communication systems. The device 110 includes a communication interface 320 and a processor 330. The communication interface 320 includes functionality of a transmitter 322 and the receiver 324 to support communications with one or more other devices within a communication system. The device 110 may also include memory 340 to store information including SA information generated by the device 110 or SA information received from other devices via one or more communication channels. Memory 340 may also include and store various operational instructions for use by the processor 330 in regards to the SA functionality described herein.

The device 110 operates to transmit and receive SA information and/or requests for such SA information to and from other devices within the communication system. For example, the communication interface 320 may be configured to transmit requests to one or more other devices within the system to request SA information. Those other devices will then transmit SA information to the device 110, and the processor 330 will process the SA information to determine one or more operational trends associated with one or more communication channels within the system. Based upon the identified operational trends, the processor 330 will then identify any actual/existing or expected failures or degradations of communications associated with the communication system.

Figure 4:
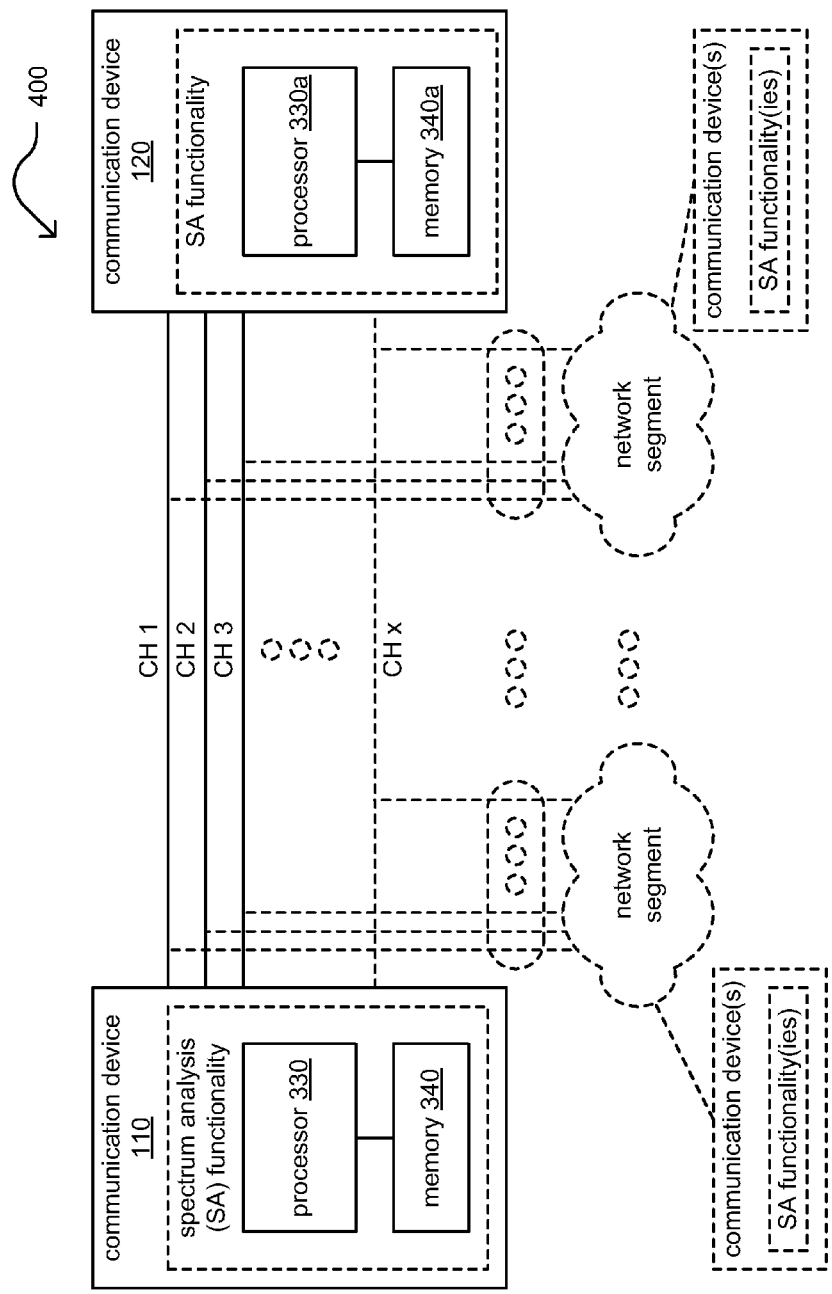
FIG. 4 is a diagram illustrating an embodiment of one or more communication systems with multi-channel communication links.

FIG. 4 is a diagram illustrating an embodiment 400 of one or more communication systems with multi-channel communication links. Communication devices 110 and 120 may communicate with one another via one or more communication channels (e.g., as shown by CH1 through CH x). Each of the devices 110 and 120 include SA functionality. For example, device 110 includes a processor 330 in the memory 340. Device 120 includes a processor 330a memory 340a. The memories 340 and 340a can store SA information and/or include operational instructions for use by the processors 330 and 330a.

Multiple network segments may interconnect the devices 110 and 122 other respective devices that may also include SA functionality therein. Any of the various devices may communicate with one another via the multi-channel communication links and/or network segments. SA functionality is distributed across multiple devices within the one or more communication systems. SA information is determined by these various devices and communicated to other of the devices for use in determining operational trends and/or actual/existing or expected failures or degradations of communications along any of the various communication links within the system.

Figure 5:
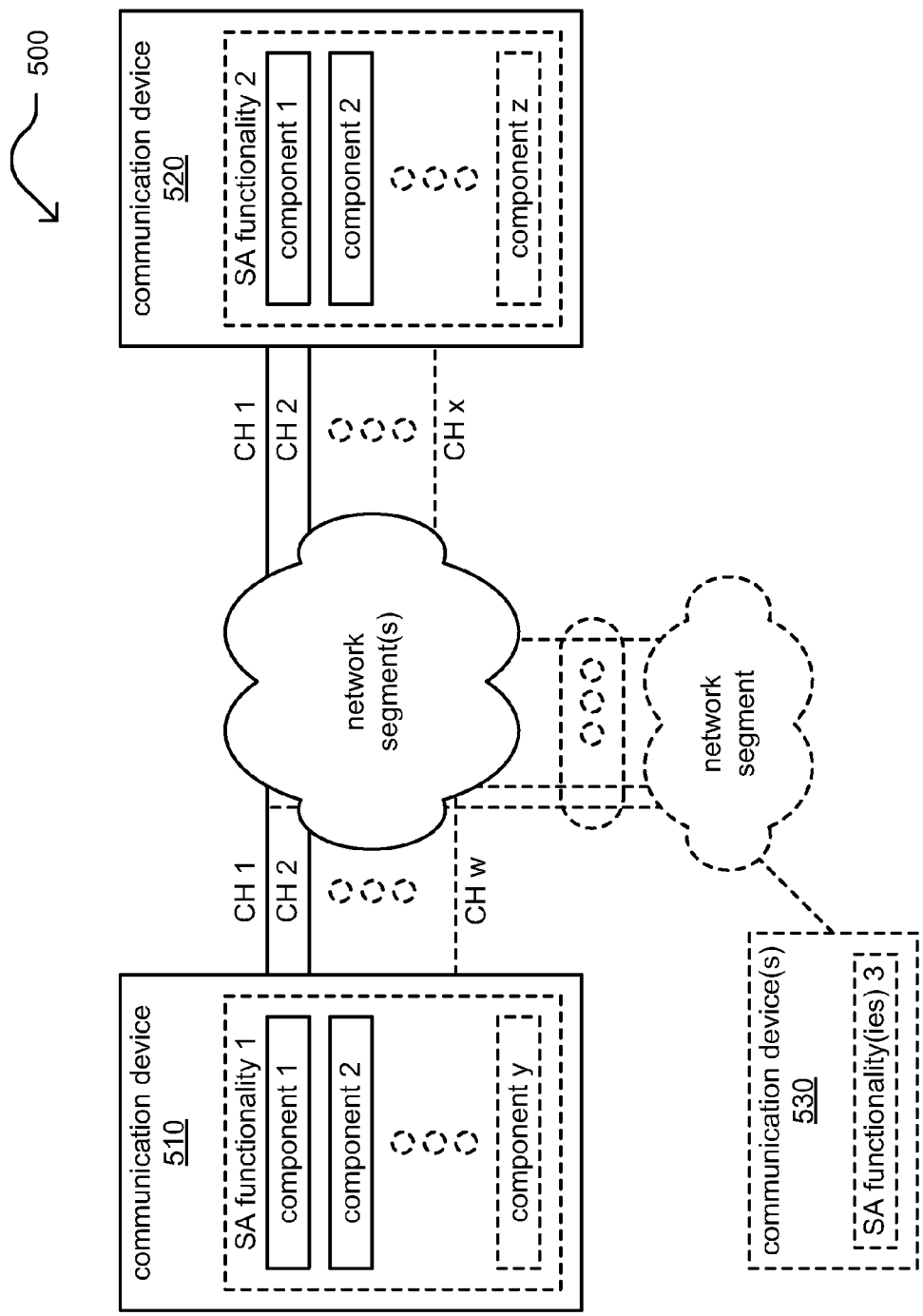
FIG. 5 is a diagram illustrating another embodiment of one or more communication systems with multi-channel communication links.

FIG. 5 is a diagram illustrating another embodiment 500 of one or more communication systems with multi-channel communication links. The embodiment 500 has some similarities to the previous embodiment 400, in that, two respective devices may communicate with one another via multi-channel communication links. However, in this diagram, communication device 510 includes SA functionality 1 and communication device 520 includes SA functionality 2. Different respective devices need not necessarily have the same SA functionality or capabilities. For example, device 510 includes components 1, 2, and up to y. Device 520 includes components 1, 2, and up to x. The devices 510 and 520 may include some common components, but need not necessarily include the same components. These different components can generate different types of SA information. For example, component 1 in device 510 may determine a channel estimate of a communication link. Component 2 in device 510 may determine a frequency response of that communication link. A component 3 (not shown) in device 510 may determine interference or noise detected on that communication link. Generally speaking, different components can have different respective capabilities and functions, and the devices 510 and 530 deed not necessarily have the exact same capabilities in terms of generating SA information. In addition, other respective devices 330 may also include different respective SA functionalities 3 as well.

Different devices implemented within the system that include different SA functionalities can operate cooperatively to provide a great deal of information regarding the overall operation of the communication system in which the devices reside. Also, an implementation that allows for different SA functionalities to be provisioned within different devices can provide for a more efficient implementation of resources.

Figure 6A:
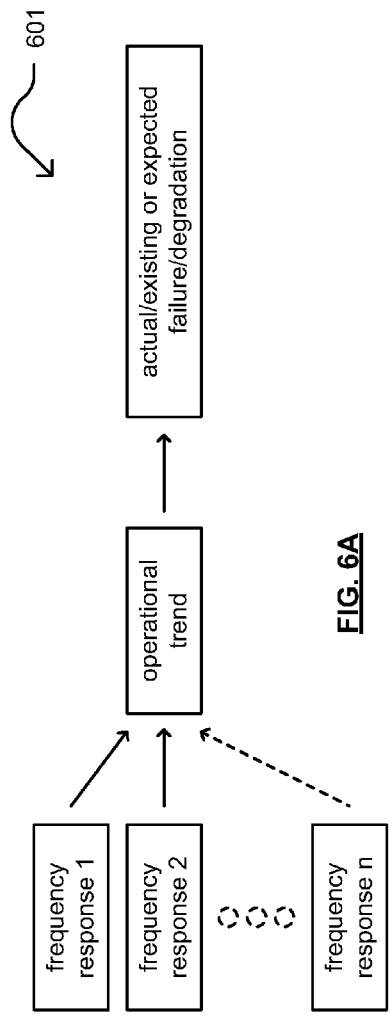
FIG. 6A is a diagram illustrating an example of processing to identify an actual/existing or expected failure or degradation within a communication system.

FIG. 6A is a diagram illustrating an example 601 of processing to identify an actual/existing or expected failure or degradation within a communication system. SA information in the form of frequency responses (e.g., frequency response 1, frequency response 2, and possibly up to frequency response n) undergo processing to determine an operational trend of at least one component within the system. This operational trend assists in the identification of an actual/existing or expected failure or degradation of that at least one component in the system.

Figure 6B:
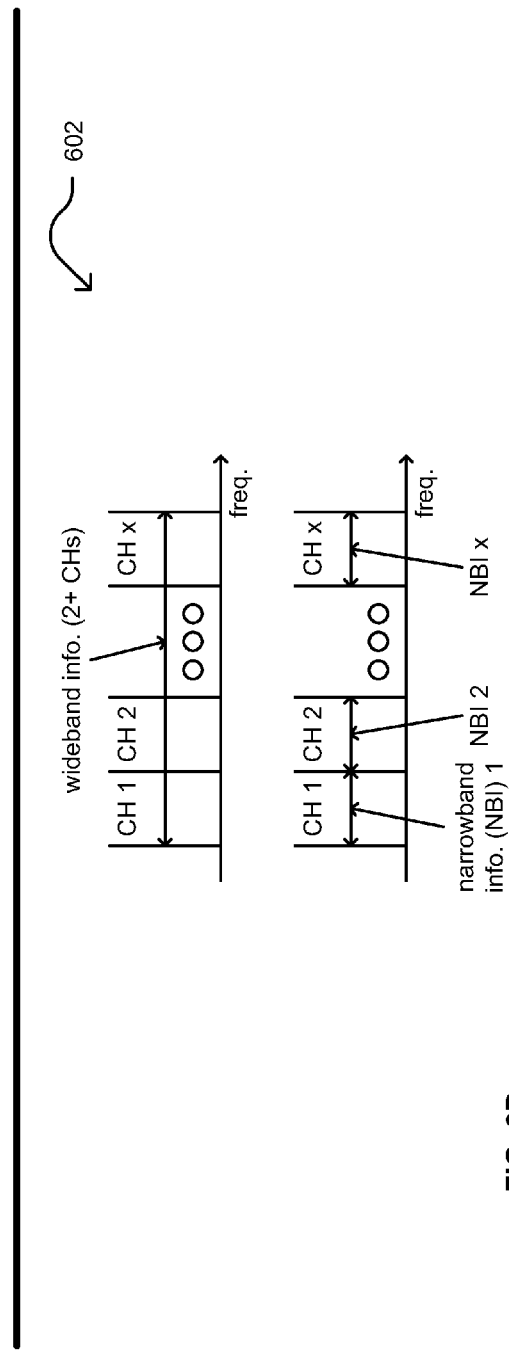
FIG. 6B is a diagram illustrating a communication channel partitioned into multiple sub-bands or sub-channels.

FIG. 6B is a diagram illustrating a communication channel 602 partitioned into multiple sub-bands or sub-channels. Some SA information may be wideband in nature such as spanning two or more of the sub-bands or sub-channels. In one or more embodiments, SA information may correspond to full bandwidth of communication system's usable frequency spectrum. Alternatively, other SA information may correspond to one of the sub-bands or sub-channels. Also, when various SA information corresponds to one of the sub-bands or sub-channels, the SA information may be combined to generate SA information that corresponds to full bandwidth of communication system's usable frequency spectrum.

The SA information can be generated using a combination of fast Fourier transform (FFT) and swept/stepped techniques. Considering one example of operation, samples from the wideband analog-to-digital converter (ADC) can be captured in a memory, an FFT/DFT (fast Fourier transform, discrete Fourier transform, or other filter bank technique) taken, and the entire broadband SA spectrum computed instantaneously based on those samples (e.g., corresponding to full bandwidth of communication system's usable frequency spectrum). Considering another example of operation, a single analog or digital filter can be swept or stepped across the band at each frequency that the received power is measured to provide a swept/stepped SA capability. Intermediate between these two examples of operation is stepping an FFT across the band to generate the SA information.

For example, a filter of 7.5 MHz bandwidth is positioned at a given frequency, samples are captured, and an FFT is taken. Then, the filter is moved to the next frequency, and the FFT is repeated. This process is repeated across the whole band from a first to a second frequency (e.g., from 54 MHz to 1008 MHz or wider). The individual narrowband (7.5 MHz) FFT segments are then combined or stitched together to produce wideband SA information.

Signaling on a given communication channel may be based on the given frequency or a given frequency band. Acquired or generated SA information may be relatively wideband such that it spans more than the frequency or frequency band associated with the communication channel. Alternatively, acquired or generated SA information may be relatively narrowband such that each individual SA information components may be but based on a sub-band of a relatively larger frequency band.

With respect to the particular SA functionality or capability included within a device, the SA functionality may be wideband (e.g., observing the entire usable frequency spectrum associated with the communication system) or narrowband (e.g., observing only narrowband portions of the frequency spectrum) such as with reference to the differing capabilities described in FIG. 5.

For example, considering a cable plant type implementation such as with reference to FIG. 2, remotely implemented SA functionality may be wideband (e.g., corresponding to full bandwidth of communication system's usable frequency spectrum) to allow observation of the whole cable plant signal from 54 MHz to 1008 MHz and beyond these limits. This permits a cable headend transmitter (or CMTS) to view problems that are affecting channels other than the ones currently in use by a given home/premises. For example, a micro-reflection in the cable may produce a ripple in the frequency response with a relative null on a given frequency channel "A". At the current time, a CM may be using channel "B" which is not affected by the null, so that's CM's service has not yet been compromised by the presence of this reflection. However, in the future, the null could move in frequency close to channel A (due to phase changes in the physical process producing the reflection/null), or the service currently on channel B could be moved to channel A, either of which would cause the null to begin to affect the service at this customer. With the wideband SA functionality, the headend (or CMTS) may observe the null on channel A, and the headend (or CMTS) will then be able to perform preventive maintenance to fix the reflection/null before the problem occurs or fully manifests itself. One or more operational trends of one or more elements within a communication system (e.g., any device, communication channel or link, etc. within the communication system) may be determined, monitored, tracked, etc. to ascertain historical and current operation of any such elements and also to estimate or predict future operation of any such elements.

Also, to improve SA selectivity, window functions such as Hanning, Hamming, Blackman/Harris, etc. may be applied to the FFT results in the time and/or frequency domains. Windowing permits the SA to display signals of large power difference (large dynamic range) which are close together in frequency, without blurring them together, and it also permits accurate measurement of signal power. Also, such techniques may also be extended in various works on multi-rate signal processing.

The SA functionality can be calibrated to improve its accuracy (e.g., at installation, periodically, upon occurrence of certain events, etc.). For example, a cable modem (CM) or set top box (STB) has its own internal frequency response which may obscure the frequency response of the cable system or portions thereof under measurement. Various techniques can be used to compensate for the self-response of the CM/STB.

One approach is to measure the self-response during the manufacturing process. Another approach is to insert pilot signals that permit measurement of the self-response during operation, or during power-up.

Figure 7:
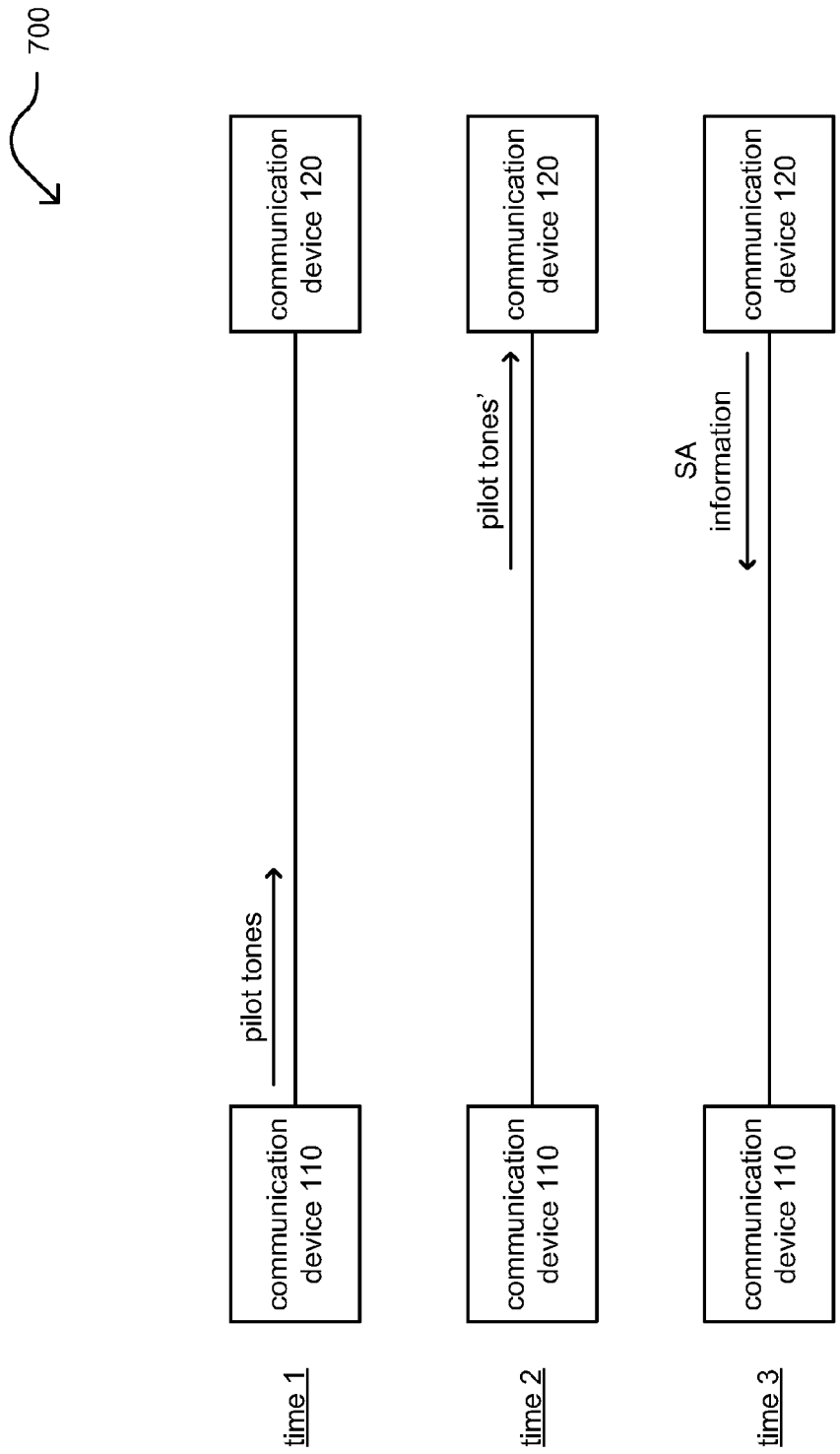
FIG. 7 is a diagram illustrating communication between communication devices to generate spectrum analysis (SA) information.

FIG. 7 is a diagram illustrating communication between communication devices 110 and 120 to generate spectrum analysis (SA) information. This diagram shows communication device 110 transmitting a signal with pilot tones (e.g., such as based on orthogonal frequency division multiplexing (OFDM) signaling) to communication device 120 at or during a first time. Then, the communication device 120 processed the received signal with the channel-affected pilot tones (shown as pilot tones'). The communication device 120 then determines SA information (e.g., a channel estimate, a frequency response, etc. of the communication channel between communication device 110 and communication device 120). The communication device 120 may then transmit or provide this SA information to the communication device 110 for use in identifying an operational trend of the communication channel between devices 110 and 120 and any actual/existing or expected failures or degradation of that communication channel.

In one example of operation, these pilot tones or signals may be inserted by a CM or STB (CM/STB) itself, or anywhere in the plant from the headend (or CMTS) downward. In some cases, tilt compensation may be purposely inserted by the CM/STB ahead of the analog to digital converter (ADC), and this tilt compensation may obscure the tilt from the cable plant. It may be decided to compensate fully or partially and remove the internal or self-frequency-responses (e.g., self-response), or to leave it in place, depending on the application. Such compensation may be performed in the time or frequency domains. Leaving the self-response in place can show the total response experienced by a signal transmitted via that communication link. Alternatively, compensating for and removing the self-response is to permit the headend (or CMTS) to analyze the performance of the cable plant itself and perform fault isolation of the plant.

In addition, any of a number of SA user interface functions may be included within a given device to provide additional or alternative SA information (e.g., added in software, such as span, center frequency, start/stop frequencies, resolution bandwidth, video bandwidth (averaging), cursors, power between cursors, max hold, multiple traces, etc.).

Within a given communication device that includes an equalizer and equalizer coefficients, those downstream equalizer coefficients may also be queried and used to analyze the quality of the downstream signal. The equalizer coefficients give information on the channel response and the effect of the channel on the signal. The equalizer coefficients and SA capability provide further insight into the quality of the signal and can be used to isolate faults in the plant. Upstream pre-equalizer coefficients can also be examined and compared to the downstream equalizer coefficients, as often a fault in the cable plant will cause a change in both the upstream and downstream signals, and hence in both the upstream and downstream equalizer coefficients.

For multi-channel receivers (e.g., such as with reference to FIG. 4, FIG. 5), there can be a set of downstream equalizer coefficients for each receiver. For example, a 32-channel CM/STB can provide equalizer coefficients for each of its 32 channels. The responses at each channel can be combined to produce a clearer picture of what is happening to the signal across the band.

Also, if a spare downstream receiver (e.g., CM/STB) is available, it can be hopped to different frequencies, and at each frequency the equalizer coefficients can be obtained, thus giving a response across the band.

Moreover, certain examples have been described herein with respect to one particular type of communication system (e.g., cable plant and including SA functionality implemented within one or more user devices [CM, STB, etc.] implemented within the cable system). Note that such functionality may be extended towards any type of communication system having any of a number of different respective types of communication links implemented using any of a number of different types of communication media (e.g., wired, wireless, optical, etc.). Any one or more respective devices within the communication system may include SA functionality to perform acquisition, processing, analysis, reporting, etc. of any variety of types of SA information (e.g., frequency responses, channel estimates, changes of such parameters, etc.).

Figure 8:
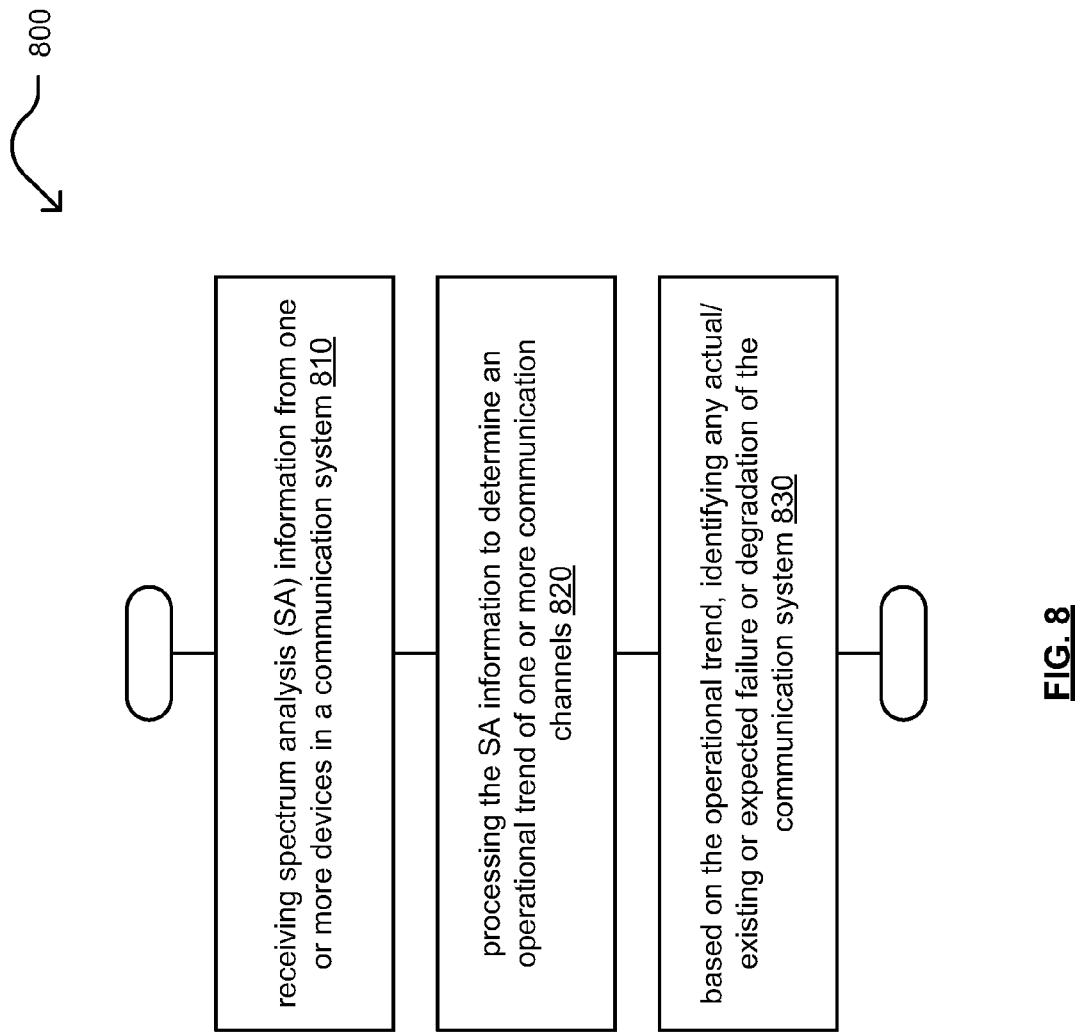
FIG. 8 is a diagram illustrating an embodiment of a method for execution by one or more communication devices.

FIG. 8 is a diagram illustrating an embodiment of a method 800 for execution by one or more communication devices. Method 800 begins by receiving spectrum analysis (SA) information from one or more devices in a communication system (block 810). Operation continues by processing the SA information to determine an operational trend of one or more communication channels (block 820). Based on the operational trend, method 800 operates by identifying any actual/existing or expected failure or degradation of the communication system (block 830).

Figure 9:
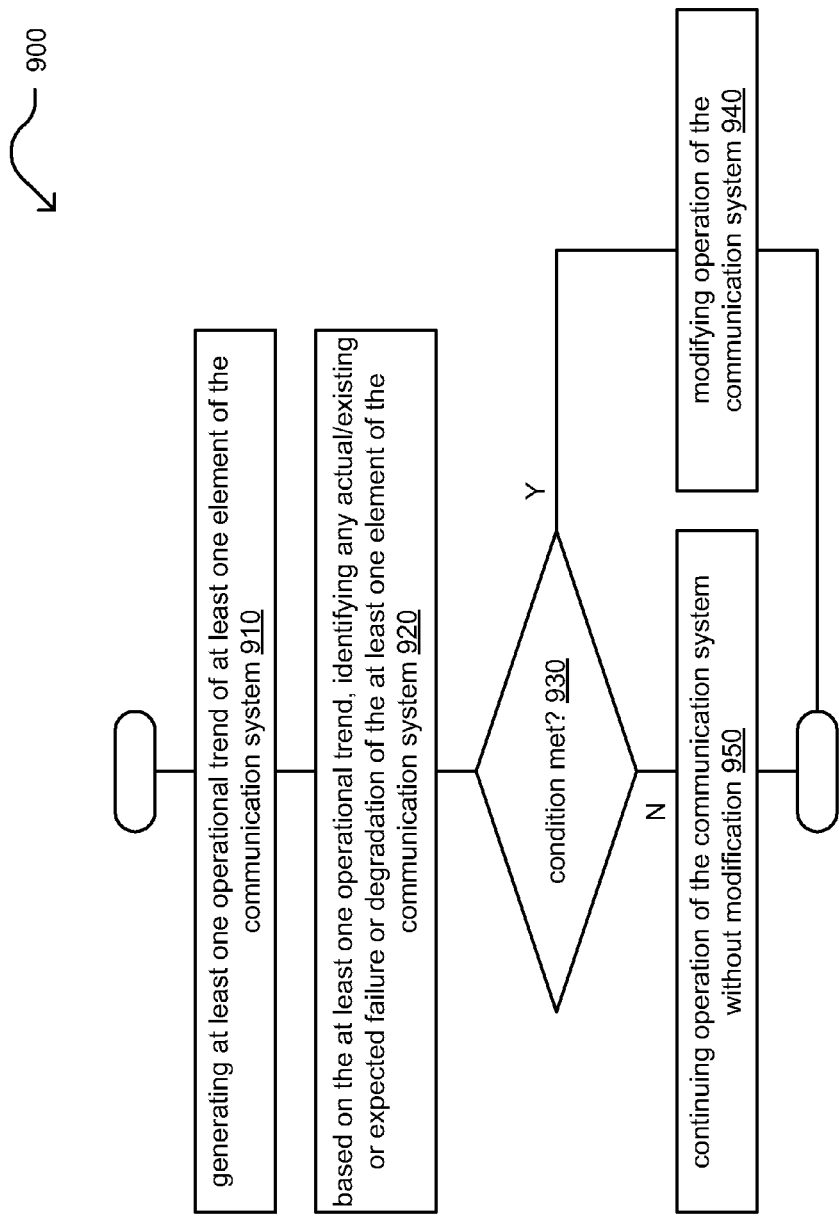
FIG. 9 is a diagram illustrating another embodiment of a method for execution by one or more communication devices.

FIG. 9 is a diagram illustrating another embodiment of a method 900 for execution by one or more communication devices. Method 900 begins by generating at least one operational trend of at least one element of the communication system (block 910). Based on the at least one operational trend, the method 900 operates by identifying any actual/existing or expected failure or degradation of the at least one element of the communication system (block 920).

In decision block 930, the method 900 operates by determining whether any actual/existing or expected failure or degradation has been identified (e.g., if one or more conditions have been met that would indicate any actual/existing or expected failure or degradation).

If no actual/existing or expected failure or degradation is identified, then the method 900 continues operation of the communication system without modification (block 950). Alternatively, if an actual/existing or expected failure or degradation is in fact identified, then the method 900 modified operation of the communication system without modification (block 950). The method 900 may iterate or loop back continually based on monitoring of the communication system in attempts to identify additional actual/existing or future expected failures or degradations.

FIG. 10A is a diagram illustrating another embodiment of a method 1000 for execution by one or more communication devices. Method 1000 begins by processing first SA information received from first communication device to generate first result (block 1010). Method 1000 continues by processing second SA information received from second communication device to generate second result (block 1020). Method 1000 then operates by combining to generate first result and second result to determine operational trend of communication within communication system (e.g., communication channel, communication device, etc.) (block 1030).

FIG. 10B is a diagram illustrating another embodiment of a method 1001 for execution by one or more communication devices. Method 1001 begins by processing first SA information received from communication device at first time to generate first result (block 1011). Method 1001 then operates processing second SA information received from the same communication device communication device at a second time to generate second result (block 1021). Method 1001 continues by combining to generate first result and second result to determine operational trend of communication within communication system (e.g., communication channel, communication device, etc.) (block 1031).

The present invention has been described herein with reference to at least one embodiment. Such embodiment(s) of the present invention have been described with the aid of structural components illustrating physical and/or logical components and with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims that follow. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may also be used herein, the terms "processing module," "processing circuit," "processing circuitry," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a functional block, hardware, and/or software stored on memory for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
 a processor configured to generate spectrum analysis (SA) information based on one or more communication channels within a communication system, wherein at least some of the SA information is based on full bandwidth of a usable frequency spectrum in the communication system; and
 a communication interface configured to transmit the SA information to at least one other communication device within the communication system for use in determining one or more characteristics associated with performance of the one or more communication channels in the communication system and for identifying, based on the one or more characteristics, a degradation of communication associated with the one or more communication channels.

2. The communication device of claim 1, wherein the SA information that includes information associated with a frequency response of the one or more communication channels; and
 the frequency response being used to identify an existing failure or degradation of communication associated with the one or more communication channels.

3. The communication device of claim 1, wherein the communication interface is further configured to transmit first SA information to at least one other communication device that includes information associated with a first frequency response of the one or more communication channels and to transmit first SA information to at least one other communication device that includes information associated with a second frequency response of the one or more communication channels;
 the first frequency response and the second frequency response being used to determine an operational trend of the one or more communication channels; and
 the operational trend being used to identify an expected degradation of communication associated with the one or more communication channels.

4. The communication device of claim 1, wherein the communication system is a cable based communication system that includes a cable modem termination system (CMTS) and one or more cable modems (CMs); and
 the full bandwidth of the usable frequency spectrum in the communication system extends from approximately 54 mega-Hertz (MHz) to 1008 MHz.

5. The communication device of claim 1, wherein the one or more characteristics associated with performance of one or more communication channels in the communication system corresponds, at least in part, to at least one of an internal frequency response of the communication device or the at least one other communication device, a frequency response of the one or more communication channels, interference or noise detected on the one or more communication channels, a reflection detected on the one or more communication channels, and a frequency null detected on the one or more communication channels.

6. The communication device of claim 1, wherein the communication interface is further configured to:
 receive at least one additional signal, that includes a plurality of pilot tones, from the at least one other communication device; and
 transmit the SA information to the least one other communication device that is based on characterization of the plurality of pilot tones received by the communication device.

7. The communication device of claim 1, wherein the processor is further configured to:
 determine first SA information of a first frequency sub-band of the one or more communication channels;
 determine second SA information of a second frequency sub-band of the one or more communication channels; and
 employ the first SA information and the second SA information to generate the SA information that is based on the full bandwidth of the usable frequency spectrum in the communication system.

8. The communication device of claim 1, wherein the communication interface is further configured to receive at least one additional signal, including information associated with the degradation of communication associated with the one or more communication channels, from the at least one other communication device.

9. A communication device comprising:
 a communication interface configured to:
  transmit a first request to a first other communication device for first spectrum analysis (SA) information;
  transmit a second request to a second other communication device for second SA information; and
  receive the first SA information and the second SA information, wherein at least one of the first SA information and the second SA information is based on full bandwidth of a usable frequency spectrum in a communication system; and
 a processor configured to process the first SA information and the second SA information to:
  determine a first characteristic associated with performance of a first communication channel in the communication system and a second characteristic associated with performance of a second communication channel in the communication system; and
  identify an existing or expected degradation of communication associated with the at least one of the first communication channel and the second communication channel based on at least one of the first characteristic and the second first characteristic.

10. The communication device of claim 9, wherein the processor is further configured to:
 determine a frequency response of at least one of the first communication channel and the second communication channel based on at least one of the first SA information and the second SA information; and
 identify, based on the frequency response, an existing failure or degradation of communication associated with at least one of the first communication channel and the second communication channel.

11. The communication device of claim 9, wherein the processor is further configured to:
 determine a frequency response of at least one of the first communication channel and the second communication channel based on at least one of the first SA information and the second SA information;
 employ the frequency response to determine an operational trend of at least one of the first communication channel and the second communication channel; and
 employ the operational trend to identify an expected failure or degradation of communication associated with at least one of the first communication channel and the second communication channel.

12. The communication device of claim 9, further comprising:

the communication device includes a cable modem termination system (CMTS);

the first other communication device includes a first cable modem (CM); and the second other communication device includes a second CM; and wherein the full bandwidth of the usable frequency spectrum in the communication system extends from approximately 54 mega-Hertz (MHz) to 1008 MHz.

13. The communication device of claim 9, wherein the first characteristic corresponds, at least in part, to at least one of an internal frequency response of the first other communication device, a frequency response of the first communication channel, interference or noise detected on the first communication channel, a reflection detected on the first communication channel, and a frequency null detected on the first communication channel.

14. A method for execution by a communication device, the method comprising:

generating spectrum analysis (SA) information based on one or more communication channels within a communication system, wherein at least some of the SA information is based on full bandwidth of a usable frequency spectrum in the communication system; and via a communication interface of the communication device, transmitting the SA information to at least one other communication device within the communication system for use in determining one or more characteristics associated with performance of the one or more communication channels in the communication system and for identifying, based on the one or more characteristics, a degradation of communication associated with the one or more communication channels.

15. The method of claim 14, further comprising:

determining a frequency response of the one or more communication channels based on the SA information; and identifying, based on the frequency response, an existing failure or degradation of communication associated with the one or more communication channels.

16. The method of claim 14, further comprising:

determining a first frequency response of the one or more communication channels based on first SA information;

determining a second frequency response of the one or more communication channels based on second SA information;

employing the first frequency response and the second frequency response to determine an operational trend of the one or more communication channels; and employing the operational trend to identify an expected degradation of communication associated with the one or more communication channels.

17. The method of claim 14, wherein the communication system is a cable based communication system that includes a cable modem termination system (CMTS) and one or more cable modems (CMs); and the full bandwidth of the usable frequency spectrum in the communication system extends from approximately 54 mega-Hertz (MHz) to 1008 MHz.

18. The method of claim 14, wherein the one or more characteristics associated with performance of one or more communication channels in the communication system corresponds, at least in part, to at least one of an internal frequency response of the communication device or the at least one other communication device, a frequency response of the one or more communication channels, interference or noise detected on the one or more communication channels, a reflection detected on the one or more communication channels, and a frequency null detected on the one or more communication channels.

19. The method of claim 14, further comprising, via the communication interface of the communication device:

receiving at least one additional signal, that includes a plurality of pilot tones, from the at least one other communication device; and transmitting the SA information to the least one other communication device that is based on characterization of the plurality of pilot tones received by the communication device.

20. The method of claim 14, further comprising:

determining first SA information of a first frequency sub-band of the one or more communication channels;

determining second SA information of a second frequency sub-band of the one or more communication channels; and employing the first SA information and the second SA information to generate the SA information that is based on the full bandwidth of the usable frequency spectrum in the communication system.

* * * * *

UNITED STATES PATENT AND TRADEMARK OFFICE
CERTIFICATE OF CORRECTION

| | | |
|---|---|---|
| PATENT NO. | : 8,897,147 B2 | Page 1 of 1 |
| APPLICATION NO. | : 13/931626 | |
| DATED | : November 25, 2014 | |
| INVENTOR(S) | : Currivan et al. | |

It is certified that error appears in the above-identified patent and that said Letters Patent is hereby corrected as shown below:

In the Claims

Col. 13, line 28, in claim 3: replace "information to at least one other communication device that" with --information to the at least one other communication device that--

Col. 13, line 31, in claim 3: replace "transmit first SA information to at least one other" with --transmit second SA information to the at least one other--

Col. 13, line 64, in claim 6: replace "to the least one" with --to the at least one--

Col. 14, line 43, in claim 9: replace "and the second first characteristic" with --and the second characteristic--

Col. 16, line 31, in claim 19: replace "information to the least one" with --information to the at least one--

Signed and Sealed this
Twenty-third Day of February, 2016

Michelle K. Lee
*Director of the United States Patent and Trademark Office*